United States Patent Office 3,812,192
Patented May 21, 1974

3,812,192
PROCESS FOR THE MANUFACTURE OF POLYTHIOBISPHENOLS
Rudolf Gabler, Uitikon-Waldegg, and Josef Studinka, Zurich, Switzerland, assignors to Inventa AG fur Forschung und Patentverwertung, Zurich, Switzerland
No Drawing. Filed May 15, 1972, Ser. No. 253,304
Claims priority, application Switzerland, May 26, 1971, 7,653/71
Int. Cl. C07c *149/18*
U.S. Cl. 260—608       8 Claims

ABSTRACT OF THE DISCLOSURE

A phenol which is unsubstituted at the position para to the hydroxy group or unsubstituted at at least one of the positions ortho to the hydroxy group is dissolved in a solvent, in the absence of hydrogen sulfide and catalysts, and while cooling to a temperature below 30° C. is reacted with disulfur dichloride. The solvent is an acid amide whose nitrogen atoms are completely alkylated. Polythiobisphenols are obtained in high yield.

---

The present invention relates to a process for the manufacture of polythiobisphenols.

Polythiobisphenols are highly active fungicides having a very broad spectrum of activity. They are of further interest as intermediate products in the artificial material industry, as auxiliary agents in vulcanization, as antioxidants and as starting materials in the production of hydroxymercaptans. Heretofore there was no simple economical method available for the manufacture of polythiobisphenols.

The prior art refers to methods for the manufacture of dithiobisphenols from phenol and sulfur (C. Lefevre and Ch. Desgraz, C r. *198* (1934) 1791) and from phenol and disulfurdichloride in benzene (Z. S. Ariyan and L. A. Wiles, Soc. 1962, 3876), or in carbon tetrachloride (E. B. Hotelling, J. Org Chem. *24* (1959) 1598), and in petroleum ether (DAS 1,145,630). These prior art methods are disadvantageous. Only undefined products are obtained from phenol and sulfur (S. Magnusson, J. Am. Pharm. Ass. Sci. Ed. *36* (1947) 257). With the methods of Hotelling, Ariyan, and DAS 1,145,630, mixtures are obtained which predominantly contain monothiobisphenols and sulfur.

German patent specification No. 1,237,132 teaches the use of an N-alkylated acid amide (N,N-dimethylformamide) as a solvent; however, it is used only in conjunction with the simultaneous use of hydrogen sulfide. Disulfur dichloride does not react with an aromatic phenol in the presence of hydrogen sulfide and in dimethylformamide solvent. Instead, it reacts quantitatively with the hydrogen sulfide to give elemental sulfur and hydrogen chloride according to the equation $$S_2Cl_2 + H_2S \rightarrow 3S + 2HCl$$

As comparative Example 3 shows, no trace of a polythiobisphenol is formed. In contrast thereto, if hydrogen sulfide is absent, the reaction runs as desired and the polythiobisphenols of the present invention are formed in 65–90% yield. This was not to be expected from the state of the art.

Surprisingly, it has now been found that polythiobisphenol ethers of the general structural formulae (I) and (II)

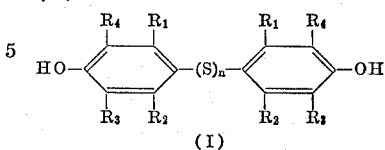

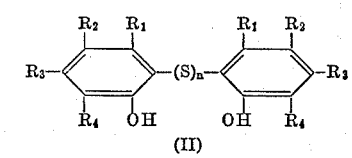

in which $n$ represents 2 or 3, and $R_1$, $R_2$, $R_3$ and $R_4$ each independently of one another represent hydrogen, alkyl (preferably $C_1$ to $C_4$) or halogen (preferably chlorine) can be produced in very good yields by treating a phenol which contains no substitution at the position para to the hydroxyl group or at at least one of the positions ortho to the hydroxyl group, in a solvent, and in the absence of hydrogen sulfide and catalysts, and while cooling to temperatures below 30° C., if the solvent is an acid amide whose nitrogen atoms are completely alkylated.

Phenols which may be employed in the manufacture of polythiobisphenols in accordance with the present invention, include those phenols which carry on the carbon atoms $R_1$, $R_2$, $R_3$ and $R_4$ only hydrogen or substituents of the first order.

Examples of such phenols are:

phenol
2,6-dimethylphenol
*o*-cresol
6-chloro-*o*-cresol
2,6-dichlorophenol
2,6-diisopropyl phenol
2,3,6-trimethylphenol
2,3,5,6-tetramethylphenol
*m*-cresol
2,4-dichloro-3,5-dimethylphenol
2,4-dimethylphenol
4-chloro-3,5-dimethylphenol
6-*t*-butyl-*o*-cresol.

Phenol is preferred.

The acid amides whose amide nitrogen atoms are completely alkylated include both open chain and cyclic amides (lactams). The alkyl groups on the amide nitrogen contain in particular 1–4 carbon atoms. The methyl group is preferred. Suitable solvents are, e.g., N,N-dimethylformamide, N,N-dimethylacetamide, N,N-dimethylpropionamide, N,N-dimethylbutyric acid amide, N,N-dimethylvaleric acid amide, N,N-diethylformamide, tetramethylurea, N-methylpyrrolidone, N-methylcaprolactam or N-ethylcaprolactam. N,N-dimethylformamide is preferred.

The solvents are generally used in admixture with inert diluents, such as, for example, benzene, toluene, methylene chloride or carbon tetrachloride. To obtain a good yield of polythiobisphenol, it is necessary that there be present at least one nitrogen equivalent per mol of introduced phenol since the alkylated amide obviously participates in the reaction as an acid acceptor.

In a first preferred form of the process for the manufacture of polythiobisphenols according to the invention, the working up is advantageously carried out in a manner such that two mols of the phenol are dissolved in N,N-dimethylformamide, N-methylpyrrolidone or another N-alkylated acid amide which, if desired, may be mixed with an inert solvent like e.g. benzene, methylene chloride or carbon tetrachloride. One to one and a half mols of disulfur dichloride are added dropwise, while cooling and under stirring. The reaction temperature can be between −60° C. and +30° C. Preferably it is −20° C. to 0° C.

The homogenous yellow to light brown reaction mixture may be worked up by various methods. In one method, the reaction mixture is poured into water, the oil which results is separated, and the last residue freed from water and organic solvents by evacuation at 100–110° C. The remaining oil is treated with an equal volume of benzene and stirred at room temperature until crystallization takes place. Sometimes crystal nuclei must be added to initiate the crystallization. The crystal slurry is freed from benzene-soluble by-products by filtration or centrifuging. 95–98% pure polythiobisphenol is obtained at a yield of 65–90%. The bisphenol may be further purified by recystallizing it from benzene or a mixture of benzene and petroleum ether.

In a second preferred form of working up the reaction mixture, the solvent or solvent mixture is first distilled from the reaction solution. The distillation must be carried out, at least towards the end, under reduced pressure. The remaining oil is washed with 3–5 times its volume of water in which crystallization of the polythiobisphenol generally takes place.

While generally p-polythiobisphenols can readily be caused to crystallize, the o-compounds form yellow oils which can be obtained in the crystalline state only in exceptional cases.

For many uses, e.g. for disinfection, for protective impregnation, and for splitting to monothiopyrocatechins, the raw o-polythiobisphenols can be used as is. For other purposes, e.g. for the production of artificial materials and antioxidants, a further purification by high vacuum or molecular distillation is advisable.

Surprisingly, the reaction according to the invention does not lead to monothiobisphenols, which always form the main reaction product when non-polar solvents are used, but instead leads to either di- or trithiobisphenols. Which of the two polythiobisphenols forms, depends, in a way not at present fully understood, on the structure of the phenol used. Although unsubstituted phenol and the cresols form dithiobisphenols, trithiobisphenols are preferentially formed when the phenol contains two or more substituents.

The process according to the present invention affords technically useful and readily available polythiobisphenols which previously could not only be made by indirect methods or in very poor yields.

The following examples are offered only for the purpose of illustrating the present invention, and not in limitation thereof. In the examples, the temperature is on the Celcius scale throughout.

Example 1 (Comparative Example according to E. B. Hotelling, J. Org. Chem. 24 (1959) 1598)

In a 1 liter four-necked round flask, provided with a stirrer, thermometer, dropping funnel, nitrogen inlet tube and a reflux cooler with a drying tube, 94 g. (1 mol) of phenol are dissolved in 500 ml. of carbon tetrachloride which contains 1 g. of sulfur. During this step a slow stream of nitrogen is passed through the apparatus. A solution of 74 g. (0.55 mol) of disulfur dichloride in 200 ml. of carbon tetrachloride is slowly dropped into the flask, while stirring. Care is taken (by cooling with ice water) that the temperature does not exceed 30°. As soon as three quarters of the $S_2Cl_2$ solution has been dropped in, coarse fragments of a solid yellow substance begin to precipitate. After all of the $S_2Cl_2$ has been added, the mixture is heated to reflux boiling temperature for 30 minutes, and then allowed to cool. The carbon tetrachloride is decanted off. The solid yellow residue is washed with 50 ml. benzene and filtered by suction filtration.

65 g. of a yellow crystalline powder melting at 132°–137° are obtained. To further purify it, the product is recrystallized from 500 ml. benzene, after which its melting point rises to 145°–147°. The identity of the substance is found by comparison with authentic samples of 4,4′-monothiobisphenol and 44,4′-dithiobisphenol.

Mixed melting point with 4,4′-monothiobisphenol: 148°
Mixed melting point with 4,4′-dithiobisphenol: 127°
I.R. spectrum (KBr pellets): 2 absorption bands at 508 and 520 cm.$^{-1}$ which are characteristic for 4,4′-monothiobisphenol.

Accordingly, Hotelling's process results in the production of a single reaction product which is isolatable in the pure state, said product being 4,4′-monothiobisphenol.

Example 2 (Comparative Example according to Z. S. Ariyan, Soc. 1962, 3876)

In a 500 ml. four-neck flask outfitted as described in Example 1, 18.8 g. of phenol (0.2 mol) are dissolved in 150 ml. of benzene. The resultant solution is cooled to 0°. While stirring, a solution of 13.5 g. (0.1 mol) of $S_2Cl_2$ in 100 ml. of benzene are added dropwise over a period of 2 hours. A thick brown crystal slurry is formed which on warming to room temperature becomes lighter in color. It is then heated for 1 hour, in a water bath, to 70° during which time the bulk of the crystals pass into solution. On cooling, crystallization again takes place. The crystals are filtered off by suction filtration, washed with a little benzene and dried, at 60°, under vacuum. 15.8 g. of a product melting at 120°–130° are obtained. When recrystallized from benzene and passed through activated charcoal, the melting point of the product rises to 144°.

Mixed melting point with 4,4′-monothiobisphenol: 147°
Mixed melting point with 4,4′-dithiobisphenol: 123°
I.R. spectrum: 2 absorption bands at 508 and 520° cm.$^{-1}$
3 g. of the product are recrystallized from 100 ml. water, in which sulfur remains. Colorless 4,4′-monothiobisphenol crystallizes out of the filtrate. In this case, also, no 4,4′-dithiobisphenol can be isolated.

Example 3 (Comparative Example according to DRP No. 1,237,132 and dependent on Example 6 of this application)

188 parts by weight of phenol in 500 parts by volume of N,N-dimethylformamide are saturated at 10° C. with hydrogen sulfide. Then 270 parts by weight of disulfur dichloride are added dropwise over a period of two hours, while stirring. Concurrently therewith, 153 parts by weight of hydrogen sulfide are added in a uniform stream. Finely divided elemental sulfur begins to separate immediately on the first addition of $S_2Cl_2$.

After completion of the addition, the mixture is stirred for a further half hour at 20° C. Then a stream of nitrogen is passed through the reaction mixture to remove hydrogen sulfide. The separated sulfur is filtered off, washed and dried. 195 parts of sulfur are obtained. This is somewhat more than the theoretical amount which corresponds to the equation $$S_2Cl_2 + H_2S \rightarrow 3S + 2HCl$$

Thus it may be concluded that all of the added disulfur dichloride is converted to elemental sulfur.

The filtrate is fractionally distilled under a vacuum of 12 mm. Hg.

The dimethylformamide solvent distills off first at a temperature of 50–60°. Phenol distills off between 82° and 85°. 178 parts by weight of phenol are recovered. This is nearly the entire quantity used. No trace of polythiobisphenol is found in the distillation residue.

If the same reaction is carried out in the absence of phenol, all of the disulfur dichloride is likewise converted to elemental sulfur.

Example 4

In a 1 liter round flask, outfitted as described in Example 1, 94 g. (1 mol) of phenol are dissolved in 400 ml. of N,N-dimethylformamide. The resultant solution is cooled to −20°. A solution of 67.5 g. of $S_2Cl_2$ in 150 ml. of benzene is added dropwise, by means of the dropping funnel, over a period of 1 hour and under stirring. The original light yellow color of the reaction mixture changes towards the end of the addition to orange.

After warming to room temperature, the clear homogenous solution is poured into 1 liter of water. A yellow oil separates. The oil is dissolved in ether, washed to neutrality with water and sodium bicarbonate, and dried over sodium sulfate. After evaporation of the ether, a yellow oil remains which crystallizes on rubbing with benzene. The crystals are filtered by means of suction filtration and recrystallization from benzene. 82.5 g. of 4,4'-dithiobisphenol having a melting point of 149.5° are obtained. This corresponds to a yield of 66% of theoretical.

Mixed melting point with 4,4'-monothiobisphenol: 128°
Mixed melting point with 4,4'-dithiobisphenol: 150°
I.R. spectrum: 1 band at $515^{-1}$ cm., which is characteristic for pure 4,4'-dithiobisphenol.

By concentrating the benzene-containing mother liquor, an additional 15.5 g. of 4,4'-dithiobisphenol can be obtained, thereby raising the total yield to 78%.

Example 5

In a 250 ml. four-necked flask outfitted as described in Example 1, 18.8 g. (0.2 mol.) of phenol are dissolved in 100 ml. of N-methylpyrrolidone. The resultant solution is cooled to −10°. A solution of 13.5 g. (0.1 mol) of $S_2Cl_2$ in 40 ml. of methylene chloride is added dropwise over a period of 20 minutes, under stirring.

First, the methylene chloride and then the N-methylpyrrolidone are distilled off on a water bath and under vacuum. The remaining oil is stirred with 150 ml. of water, and sodium bicarbonate is added thereto to bring the pH to 3–4. The oil solidifies to a crystal slurry which is filtered by suction filtration and then recrystallized from benzene. 16.5 g. of product corresponding to a yield of 66% of theoretical are obtained. The product is shown by its IR spectrum (one band at 515 cm.$^{-1}$) to be pure 4,4'-dithiobisphenol, which has a melting point of 149–150°.

By concentrating the mother liquor, an additional 1.5 g. of 4,4'-dithiobisphenol are obtained, thereby raising the yield to 72%.

Example 6

Corresponding to the preceding Example 4, 12.2 g. (0.1 mol) of 2,6-dimethylphenol in 50 ml. of N,N-dimethylformamide are treated at −40° with a solution of 10.2 g. of $S_2Cl_2$ in 15 ml. of benzene.

The working up is carried out as described in Example 3. 4,4' - dihydroxy-3,5,3',5'-tetramethyldiphenyltrisulfide, melting at 139.5°, is obtained in a yield of 82% of theoretical.

Analysis.—$C_{16}H_{18}O_2S_3$ (molecular weight=338.5). Calculated (percent): C, 56.81; H, 5.32; S, 28.35. Found (percent): C, 57.08; H, 5.59; S, 27.94.

Example 7

Corresponding to Example 4, 32.6 g. of 2,6-dichlorophenol (0.2 mol) in 150 ml. of N,N-dimethylformamide are treated at −30° with a solution of 13.5 g. (0.1 mol) of $S_2Cl_2$ in 15 ml. of benzene.

After completion of the reaction and warming to room temperature, the solution is poured into 400 ml. of water and the separated oil is extracted with ether. After evaporation of the ether, there remains an oily residue which crystallizes spontaneously on cooling. Recrystallization from benzene-petroleum ether (1:1) yields 28.8 g., corresponding to 74% of theoretical, of 4,4'-dihydroxy-3,5,3',5'-tetrachlorodiphenyldisulfide which has a melting point of 105°.

Analysis.—$C_{14}H_6O_2S_2Cl_4$ (molecular weight=388.12). Calculated (percent): C, 37.10; H, 1.55; S, 16.50; Cl, 36.6. Found (percent): C, 37.09; H, 1.59; S, 16.63; Cl, 36.49.

Example 8

Corresponding to Example 4, 14.25 g. (0.1 mol) of 6-chloro-o-cresol in 50 ml. of N,N-dimethylformamide are treated at −40° with a solution of 6.75 g. (0.05 mol) of $S_2Cl_2$ in 10 ml. of benzene.

The working up is carried out as described in Example 6. 4,4' - dihydroxy-3,3'-dimethyl-5,5'-dichlorodiphenyltrisulfide, melting at 100° C., is obtained in a yield of 62% of theoretical.

Analysis.—$C_{14}H_{12}O_2S_3Cl_2$ (molecular weight=379.28). Calculated (percent): C, 44.31; H, 3.17; S, 25.32; Cl, 18.74. Found (percent): C, 44.51; H, 3.28; S, 25.10; Cl, 18.72.

Example 9

Corresponding to Example 4, 12.2 g. of 2,4-dimethylphenol (0.1 mol) in 50 ml. of N,N-dimethylformamide are treated at −35° with a solution of 6.75° (0.05 mol) of $S_2Cl_2$ in 10 ml. of benzene.

After the customary working up by pouring into water and extraction with ether, 13.6 g., corresponding to a yield of 89% of theoretical, of 2,2'-dihydroxy-3,3',5,5'-tetramethyldiphenyldisulfide are obtained, as a brown oil.

Analysis.—$C_{16}H_{18}O_2S_2$ (molecular weight=306.3). Calculated (percent): C, 62.7; H, 5.87; S, 20.88. Found (percent): C, 62.4; H, 5.46; S, 20.39.

What is claimed is:

1. A process for the manufacture of polythiobisphenols of the general structural formula I or II

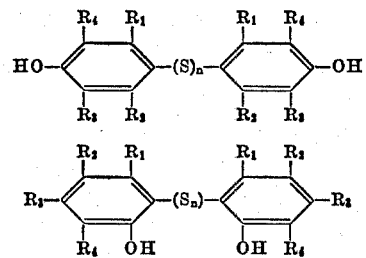

in which $n$ is 2 or 3, and $R_1$, $R_2$, $R_3$ and $R_4$ independently of one another are hydrogen, an alkyl group having 1 to 4 carbon atoms, or halogen, which comprises tne step of dissolving a phenol which is unsubstituted at the position para to the hydroxy group or unsubstituted at at least one of the positions ortho to the hydroxy group, in a solvent, in the absence of hydrogen sulfide and catalysts, and while cooling to a temperature below +30° C., and reacting the phenol with disulfur dichloride, the phenol and disulfur dichloride being present in a molar ratio of about 2:1 said solvent being an acid amide whose nitrogen atoms are completely alkylated, and said solvent being present in an amount at least equimolar with the phenol.

2. The process according to claim 1, wherein the solvent is N,N-dimethylformamide.

3. The process according to claim 1, wherein the solvent is N-methylpyrrolidone-(2).

4. The process according to claim 1, wherein for each mol of phenol one nitrogen equivalent of the alkylated acid amide is employed.

5. The process according to claim 1 wherein the solvent is a mixture of an N-alkylated acid amide and an inert diluent.

6. The process according to claim 5 wherein the diluent is benzene.

7. The process according to claim 1 wherein the reaction is carried out at −60° to +30° C.

8. The process according to claim 1 wherein the reaction is carried out at −20° to 0° C.

References Cited

UNITED STATES PATENTS

| | | | |
|---|---|---|---|
| 3,057,926 | 10/1962 | Coffield | 260—608 |
| 2,470,545 | 5/1949 | Blake | 260—608 |
| 2,270,183 | 11/1942 | Cook | 260—608 |

FOREIGN PATENTS

| | | | |
|---|---|---|---|
| 1,145,630 | 3/1963 | Germany | 260—608 |
| 994,506 | 6/1965 | Great Britain | 260—608 |

LEWIS GOTTS, Primary Examiner

D. R. PHILLIPS, Assistant Examiner

U.S. Cl. X.R.

260—367.2, 609 F